(12) United States Patent
Suzuki et al.

(10) Patent No.: US 10,612,570 B2
(45) Date of Patent: Apr. 7, 2020

(54) FLUID PRESSURE CYLINDER

(71) Applicant: SMC CORPORATION, Chiyoda-ku (JP)

(72) Inventors: Yasunaga Suzuki, Kasukabe (JP); Chiaki Fukui, Abiko (JP); Makoto Yaegashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 58 days.

(21) Appl. No.: 15/580,109

(22) PCT Filed: Jun. 1, 2016

(86) PCT No.: PCT/JP2016/002634
§ 371 (c)(1),
(2) Date: Dec. 6, 2017

(87) PCT Pub. No.: WO2016/199372
PCT Pub. Date: Dec. 15, 2016

(65) Prior Publication Data
US 2018/0172036 A1    Jun. 21, 2018

(30) Foreign Application Priority Data
Jun. 11, 2015    (JP) ................................ 2015-118178

(51) Int. Cl.
*F15B 15/22*    (2006.01)
*F15B 15/14*    (2006.01)
*F16J 1/12*    (2006.01)

(52) U.S. Cl.
CPC ........ *F15B 15/226* (2013.01); *F15B 15/1438* (2013.01); *F15B 15/1447* (2013.01); *F16J 1/12* (2013.01)

(58) Field of Classification Search
CPC ........ F15B 15/226; F15B 15/1447; F16J 1/12
See application file for complete search history.

(56) References Cited

U.S. PATENT DOCUMENTS 2,616,687 A    11/1952    Butterfield
3,136,225 A    6/1964    Rader
(Continued)

FOREIGN PATENT DOCUMENTS

CH    643 638 A5    6/1984
CN    1272167 A    11/2000
(Continued)

OTHER PUBLICATIONS

U.S. Appl. No. 15/580,098, filed Dec. 6, 2017, Yasunaga Suzuki, et al.

(Continued)

*Primary Examiner* — Thomas E Lazo
(74) *Attorney, Agent, or Firm* — Oblon, McClelland, Maier & Neustadt, L.L.P.

(57) ABSTRACT

In a fluid pressure cylinder, a piston unit, which is displaced along an axial direction under the supply of a pressure fluid, is disposed in the interior of a cylinder tube of the fluid pressure cylinder. The piston unit includes a disk shaped plate body connected to one end of a piston rod, and a ring body connected to an outer edge portion of the plate body. The plate body is formed from an elastically deformable metal material, and by the plate body becoming elastically deformed and flexing when the ring body of the piston unit abuts against the head cover or the rod cover, shocks applied with respect to the piston unit are buffered.

2 Claims, 9 Drawing Sheets

(56) References Cited

U.S. PATENT DOCUMENTS

| | | | |
|---|---|---|---|
| 3,175,474 | A | 3/1965 | Eickmann |
| 3,655,204 | A | 4/1972 | Sievenpiper |
| 3,835,753 | A | 9/1974 | Bunyard |
| 4,086,456 | A | 4/1978 | Bone |
| 4,312,264 | A | 1/1982 | Nunnemacher et al. |
| 4,370,918 | A * | 2/1983 | Pringle ............... B60T 17/081 92/163 |
| 4,896,584 | A | 1/1990 | Stoll et al. |
| 5,193,433 | A * | 3/1993 | Reimer ............... F15B 15/223 91/27 |
| 5,241,896 | A | 9/1993 | Braun et al. |
| 5,400,696 | A | 3/1995 | Weber |
| 5,618,142 | A | 4/1997 | Sonden et al. |
| 5,651,631 | A | 7/1997 | Carmien |
| 6,038,959 | A | 3/2000 | Sawada |
| 6,186,484 | B1 | 2/2001 | Noda et al. |
| 6,199,847 | B1 | 3/2001 | Fukui |
| 6,386,088 | B1 | 5/2002 | Yoshimoto et al. |
| 9,038,527 | B2 | 5/2015 | Orihara et al. |
| 9,410,624 | B2 | 8/2016 | George |
| 2004/0107557 | A1 | 6/2004 | Morris et al. |
| 2007/0048156 | A1 | 3/2007 | Chung et al. |
| 2008/0173169 | A1 | 7/2008 | Kari |
| 2013/0032027 | A1 | 2/2013 | Orihara et al. |
| 2014/0069271 | A1 * | 3/2014 | Ishibashi ............. F16J 1/008 92/138 |
| 2014/0076157 | A1 * | 3/2014 | Fukui ................. F16J 1/008 92/128 |
| 2014/0157981 | A1 * | 6/2014 | Saito .................. F16J 10/02 92/169.1 |
| 2015/0267723 | A1 | 9/2015 | Kim |
| 2016/0084220 | A1 | 3/2016 | Moeller et al. |
| 2017/0191507 | A1 | 7/2017 | Marinoni et al. |

FOREIGN PATENT DOCUMENTS

| | | |
|---|---|---|
| CN | 201170227 Y | 12/2008 |
| CN | 201599273 U | 10/2010 |
| CN | 103562567 A | 2/2014 |
| DE | 81 24 287 U1 | 12/1981 |
| DE | 199 25 600 A1 | 12/2000 |
| DE | 101 41 560 A1 | 3/2003 |
| DE | 10 2009 020 286 A1 | 11/2010 |
| EP | 0 190 528 A1 | 8/1986 |
| EP | 1 001 174 A1 | 5/2000 |
| FR | 2 575 527 A1 | 7/1986 |
| JP | 48-14117 Y1 | 4/1973 |
| JP | 50-152085 | 12/1975 |
| JP | 52-27972 | 3/1977 |
| JP | 52-125985 A | 10/1977 |
| JP | 56-5605 Y1 | 2/1981 |
| JP | 56-115010 U | 9/1981 |
| JP | 59-1493 U | 1/1984 |
| JP | 62-107103 U | 7/1987 |
| JP | 63-111303 A | 5/1988 |
| JP | 5-6204 U | 1/1993 |
| JP | 5-59212 U | 8/1993 |
| JP | 11-37112 A | 2/1999 |
| JP | 11-62910 A | 3/1999 |
| JP | 11-132204 A | 5/1999 |
| JP | 11-153104 A | 6/1999 |
| JP | 2000-074007 A | 3/2000 |
| JP | 2005-54977 A | 3/2005 |
| JP | 2007-16916 A | 1/2007 |
| JP | 2008-133920 A | 6/2008 |
| JP | 2012-57770 A | 3/2012 |
| JP | 2014-219038 A | 11/2014 |
| KR | 10-2014-0034198 A | 3/2014 |
| KR | 10-2014-0074845 A | 6/2014 |
| TW | M495452 U | 2/2015 |
| WO | WO 2012/161159 A1 | 11/2012 |

OTHER PUBLICATIONS

U.S. Appl. No. 15/580,106, filed Dec. 6, 2017, Yasunaga Suzuki, et al.
U.S. Appl. No. 15/580,125, filed Dec. 6, 2017, Yasunaga Suzuki, et al.
U.S. Appl. No. 15/580,133, filed Dec. 6, 2017, Yasunaga Suzuki, et al.
U.S. Appl. No. 15/580,124, filed Dec. 6, 2017, Yasunaga Suzuki, et al.
International Search Report and Written Opinion dated Sep. 28, 2016 in PCT/JP2016/002634 filed Jun. 1, 2016.
Japanese Office Action dated Aug. 7, 2018 in Japanese Patent Application No. 2015-118190 (with English translation), 5 pages.
Japanese Office Action dated Aug. 7, 2018 in Japanese Patent Application No. 2015-118174 (with English translation), 9 pages.
Combined Chinese Office Action and Search Report dated Jan. 11, 2019 in Chinese Patent Application No. 201680033247.0 (with English translation), 12 pages.
Combined Chinese Office Action and Search Report dated Dec. 26, 2018 in Chinese Patent Application No. 201680033635.9 (with English translation), 12 pages.
Combined Chinese Office Action and Search Report dated Dec. 27, 2018 in Chinese Patent Application No. 201680033652.2 (with English translation), 16 pages.
Combined Chinese Office Action and Search Report dated Jan. 16, 2019 in Chinese Patent Application No. 201680033671.5 (with English translation), 17 pages.
Office Action dated Jan. 9, 2018 in Japanese Patent Application No. 2015-118174 (with English language translation).
Office Action dated Jan. 9, 2018 in Japanese Patent Application No. 2015-118182 (with English language translation).
Office Action dated Jan. 9, 2018 in Japanese Patent Application No. 2015-118190 (with English language translation).
Office Action dated Mar. 18, 2019 in Korean Patent Application No. 10-2018-7000911, 8 pages (with unedited computer generated English translation).
Office Action dated Mar. 18, 2019 in Korean Patent Application No. 10-2018-7000913, 7 pages (with unedited computer generated English translation).
Office Action dated Mar. 18, 2019 in Korean Patent Application No. 10-2018-7000915, 7 pages (with unedited computer generated English translation).
Office Action dated Jun. 24, 2019, in co-pending U.S. Appl. No. 15/580,125, 13 pages.
Office Action dated Jun. 10, 2019 in co-pending U.S. Appl. No. 15/580,124.
Office Action dated Jun. 3, 2019 in co-pending U.S. Appl. No. 15/580,106.
Office Action dated May 21, 2019 in co-pending U.S. Appl. No. 15/580,133.
U.S. Office Action dated Nov. 4, 2019 in U.S. Appl. No. 15/580,125.
Korean Office Action dated Aug. 5, 2019 in Korean Patent Application No. 10-2018-7000911 (with unedited computer generated English translation), 9 pages.
Combined Chinese Office Action and Search Report dated Aug. 14, 2019 in Chinese Patent Application No. 201680033045.6 (with English translation), 17 pages.
Office Action dated Aug. 8, 2019 in co-pending U.S. Appl. No. 15/580,098, 14 pages.

* cited by examiner

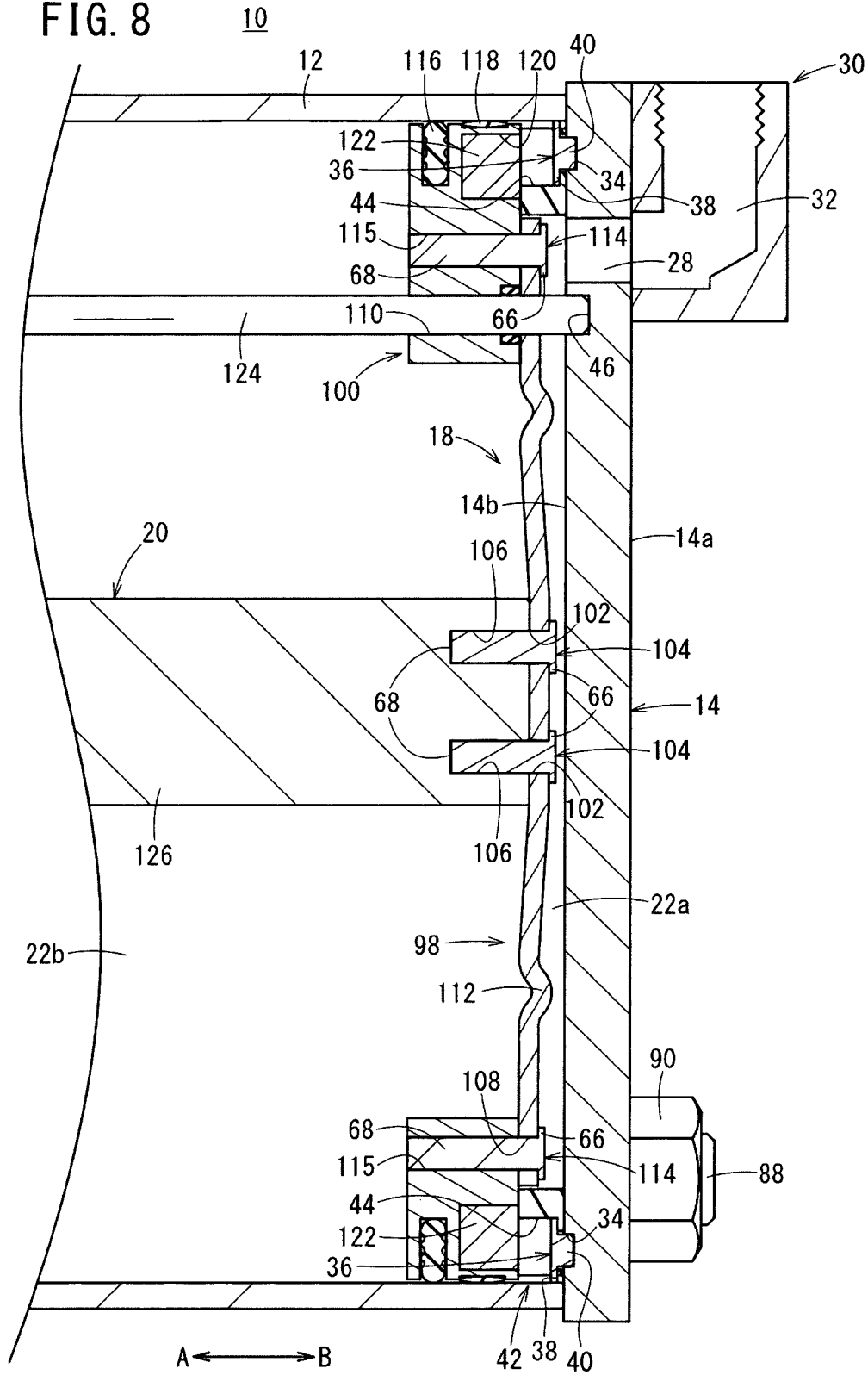

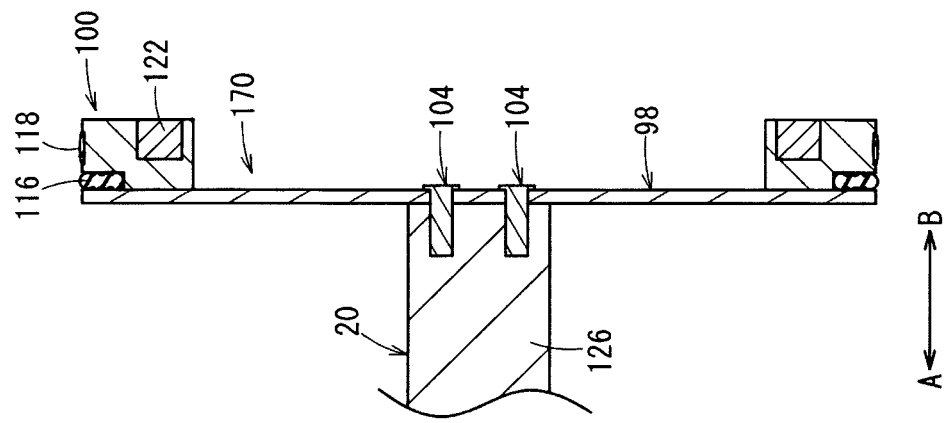
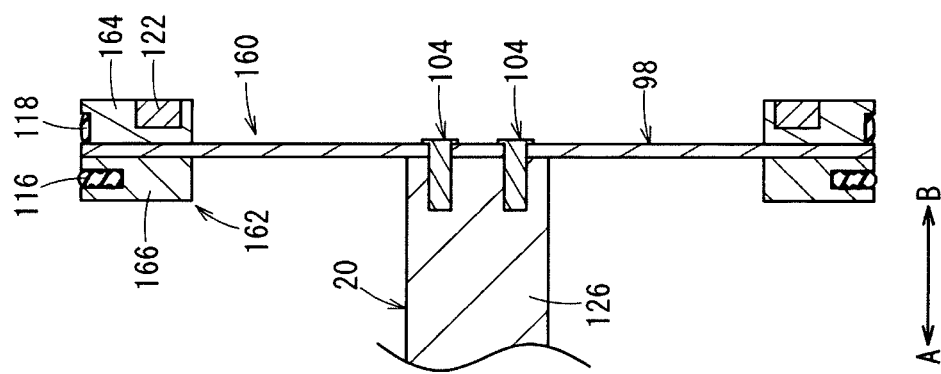
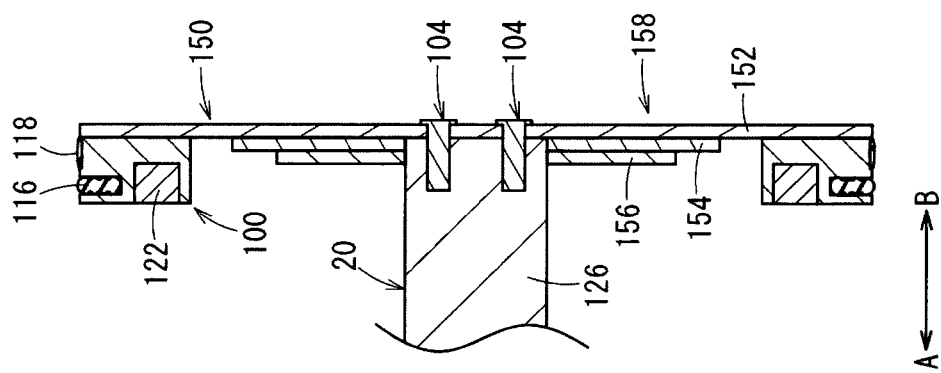

FLUID PRESSURE CYLINDER

TECHNICAL FIELD

The present invention relates to a fluid pressure cylinder that displaces a piston in an axial direction under the supply of a pressure fluid.

BACKGROUND ART

Conventionally, as a transport means for a workpiece or the like, for example, a fluid pressure cylinder having a piston that is displaced under the supply of a pressure fluid has been used. The present applicant has proposed a fluid pressure cylinder, as disclosed in Japanese Laid-Open Patent Publication No. 2008-133920, which is closed on both ends by a head cover and a rod cover, and in which the head cover and the rod cover are tightly fastened together with the cylinder tube by four connecting rods.

With this type of fluid pressure cylinder, a piston and a piston rod are disposed for displacement in the interior of the cylinder tube, and by supplying a pressure fluid into cylinder chambers that are formed between the piston and the cylinder tube, the piston is displaced along the axial directions.

SUMMARY OF INVENTION

A general object of the present invention is to provide a fluid pressure cylinder, which with a simple structure, is capable of buffering shocks that occur when the piston is displaced and abuts against a cover member.

The present invention is characterized by a fluid pressure cylinder comprising a cylinder tube including cylinder chambers defined in interior thereof, cover members attached to ends of the cylinder tube, a piston disposed displaceably along the cylinder chambers, and a piston rod that is connected to the piston.

The piston comprises a piston main body configured to slide in contact with an inner circumferential surface of the cylinder tube, and an elastically deformable plate body configured to connect an end of the piston rod and the piston main body.

The plate body is configured to undergo elastic deformation when the piston abuts against the cover members.

According to the present invention, in the fluid pressure cylinder, the piston comprises a piston main body that slides in contact with an inner circumferential surface of the cylinder tube, and an elastically deformable plate body that connects an end of the piston rod and the piston main body, and the plate body undergoes elastic deformation when the piston abuts against the cover members under a supplying action of the pressure fluid.

Consequently, by the plate body undergoing elastic deformation, shocks that occur when the piston abuts against the cover members are suitably absorbed, and transmission of such shocks to the piston rod is suppressed. As a result, with a simple configuration in which the piston main body and the piston rod are connected together mutually by the elastically deformable plate body, it is possible for shocks, which occur when the piston abuts against the cover members, to be preferably buffered.

The above and other objects, features and advantages of the present invention will become more apparent from the following description when taken in conjunction with the accompanying drawings, in which a preferred embodiment of the present invention is shown by way of illustrative example.

BRIEF DESCRIPTION OF DRAWINGS

FIG. 8 is an enlarged cross-sectional view showing a state in which the piston unit of FIG. 2 abuts against the head cover;

FIG. 9A is an enlarged cross-sectional view showing the piston unit according to a first modification; FIG. 9B is an enlarged cross-sectional view showing the piston unit according to a second modification; and FIG. 9C is an enlarged cross-sectional view showing the piston unit according to a third modification.

DESCRIPTION OF EMBODIMENTS

Figure 1:
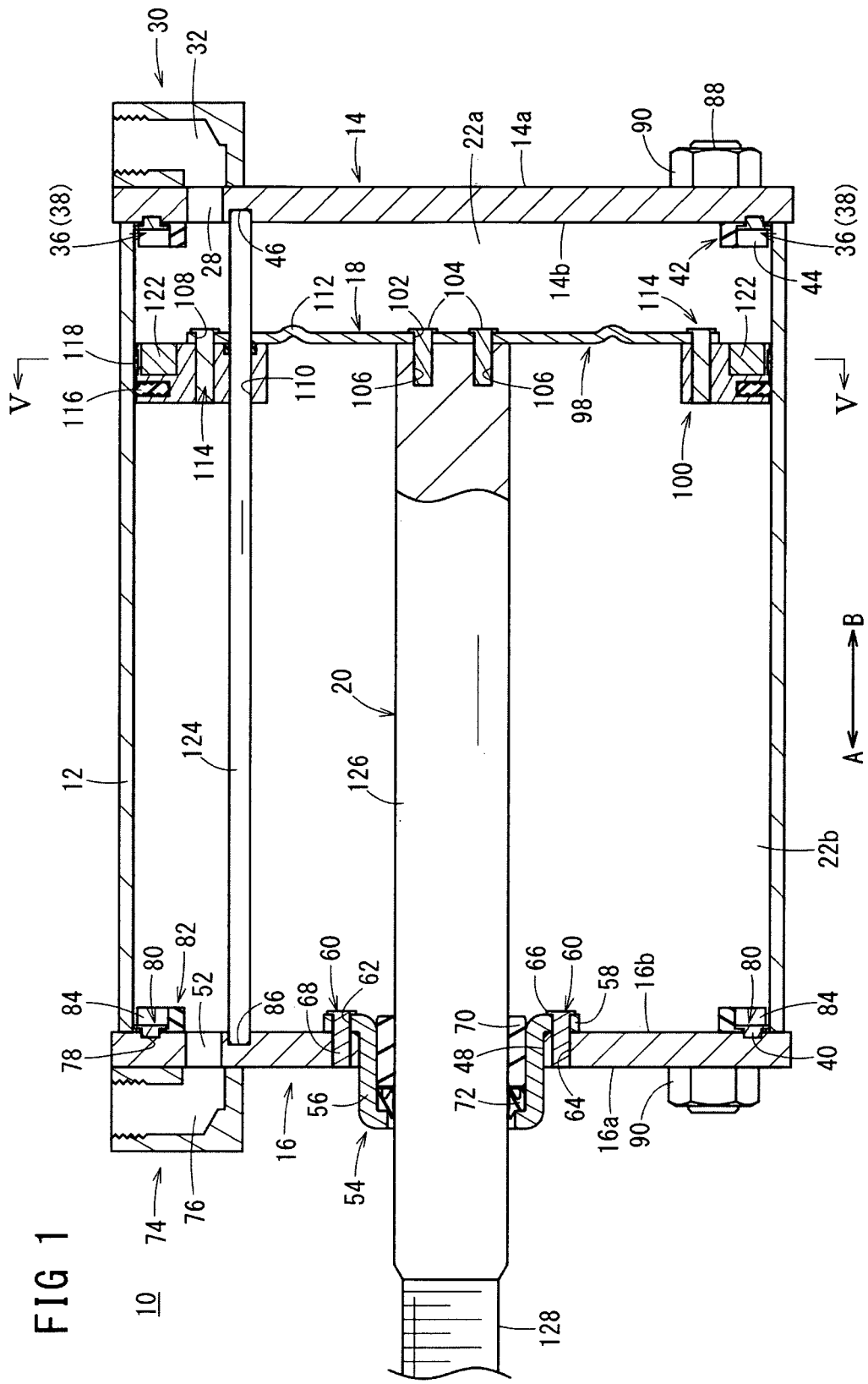
FIG. 1 is an overall cross-sectional view of a fluid pressure cylinder according to an embodiment of the present invention.

As shown in FIG. 1, a fluid pressure cylinder 10 includes a tubular shaped cylinder tube 12, a head cover (cover member) 14 that is mounted on one end of the cylinder tube 12, a rod cover (cover member) 16 that is mounted on another end of the cylinder tube 12, a piston unit (piston) 18 that is disposed for displacement in the interior of the cylinder tube 12, and a piston rod 20 that is connected to the piston unit 18.

The cylinder tube 12, for example, is constituted from a cylindrical body that is formed from a metal material, and extends with a constant cross-sectional area along the axial direction (the directions of arrows A and B), and in the interior thereof, cylinder chambers 22a, 22b are formed in which the piston unit 18 is accommodated. Further, on both ends of the cylinder tube 12, ring shaped seal members (not shown) are installed respectively through annular grooves.

As shown in FIGS. 1 through 3A and 4A, the head cover 14, for example, is a plate body that is formed with a substantially rectangular shape in cross section from a metal material, which is provided to cover one end of the cylinder tube 12. At this time, by the seal member (not shown), which is disposed on the end of the cylinder tube 12, abutting against the head cover 14, a pressure fluid is prevented from leaking out from the cylinder chamber 22a through a gap between the cylinder tube 12 and the head cover 14.

Figure 4A:
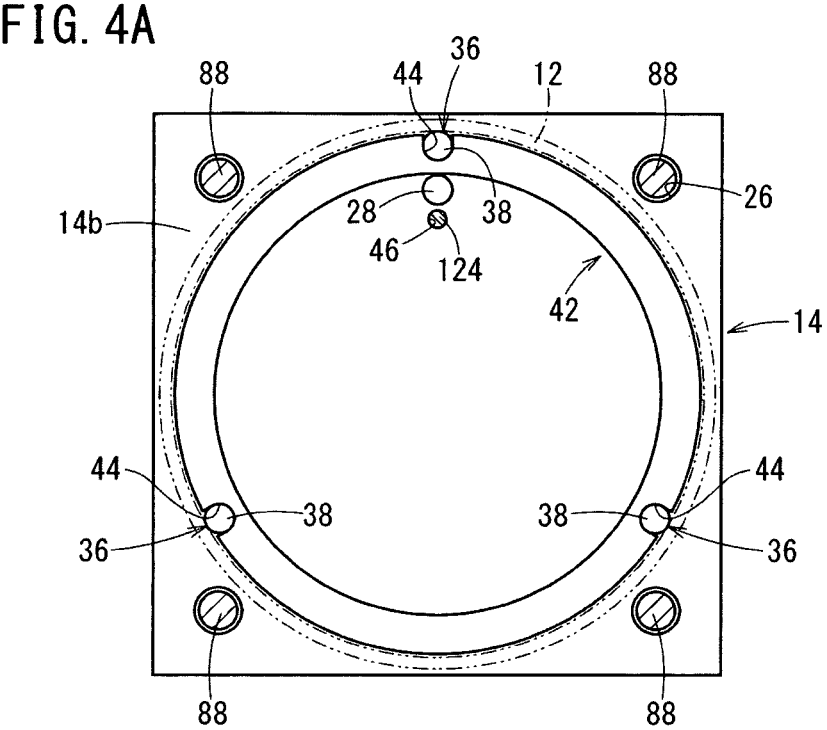
FIG. 4A is a front view shown partially in cross section of the head cover of FIG. 3A as seen from a side of the cylinder tube.

Further, as shown in FIG. 4A, in the vicinity of the four corners of the head cover 14, four first holes 26 are formed, respectively, through which later-described connecting rods 88 are inserted. A first communication hole 28 is formed at a position on a central side of the head cover 14 with respect to the first holes 26. The first holes 26 and the first communication hole 28 penetrate respectively in a thickness direction (the directions of arrows A and B) of the head cover 14 shown in FIGS. 1 and 2.

A first port member 30 from which the pressure fluid is supplied and discharged is provided on an outer wall surface 14a of the head cover 14, to which a pressure fluid supply source is connected through a non-illustrated pipe. The first port member 30, for example, is constituted from a block body, which is formed from a metal material, and is fixed by welding or the like.

Further, in the interior of the first port member 30, a port passage 32, which is formed with an L-shape in cross-section, is formed, and an opening thereof is fixed with respect to the outer wall surface 14a of the head cover 14 in a state of being opened in a direction perpendicular to the axial direction of the cylinder tube 12.

In addition, by the port passage 32 of the first port member 30 communicating with the first communication hole 28 of the head cover 14, the first port member 30 and the interior of the cylinder tube 12 are placed in communication.

Instead of providing the first port member 30, for example, a pipe connection fitting may be connected directly with respect to the first communication hole 28.

Figure 2:
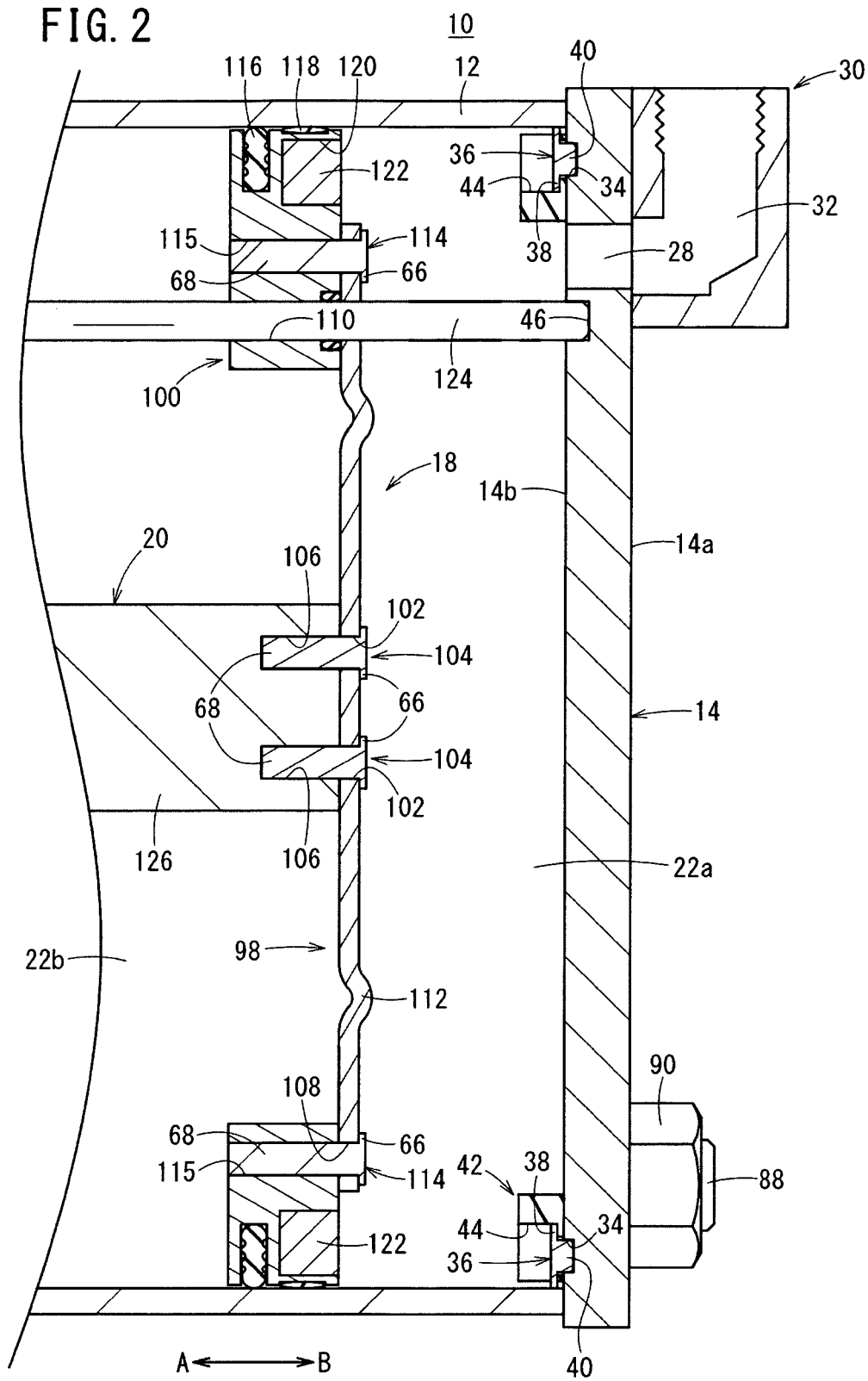
FIG. 2 is an enlarged cross-sectional view of the vicinity of a piston unit in the fluid pressure cylinder of FIG. 1.

On the other hand, on an inner wall surface 14b of the head cover 14 formed on a side of the cylinder tube 12 (in the direction of the arrow A), as shown in FIGS. 1, 2 and 4A, a plurality of (for example, three) first pin holes 34 are formed on a circumferential pitch that is smaller in diameter than the inner circumferential diameter of the cylinder tube 12, and first spigot pins 36 are inserted respectively into the first pin holes 34. The first pin holes 34 are formed on a circumference having a predetermined diameter with respect to the center of the head cover 14, and are separated by equal intervals mutually along the circumferential direction.

The first spigot pins 36 are disposed in a plurality so as to be of the same number as the first pin holes 34, and are made up from flange members 38 formed with circular shapes in cross section, and shaft members 40 of a smaller diameter than the flange members 38 which are inserted into the first pin holes 34. In addition, by press-fitting of the shaft members 40 of the first spigot pins 36 into the first pin holes 34, the first spigot pins 36 are fixed, respectively, to the inner wall surface 14b of the head cover 14, and the flange members 38 thereof are in a state of projecting out with respect to the inner wall surface 14b of the head cover 14.

Further, when the cylinder tube 12 is assembled with respect to the head cover 14, as shown in FIG. 4A, the outer circumferential surfaces of the flange members 38 of the first spigot pins 36 come into internal contact with, i.e., inscribe, respectively, the inner circumferential surface of the cylinder tube 12, whereby the cylinder tube 12 is positioned with respect to the head cover 14. More specifically, the plural first spigot pins 36 function as positioning means for positioning the one end of the cylinder tube 12 with respect to the head cover 14.

Stated otherwise, the first spigot pins 36 are arranged on a circumference having a predetermined diameter so that the outer circumferential surfaces thereof internally contact or inscribe the inner circumferential surface of the cylinder tube 12.

A ring shaped first damper 42 is disposed on the inner wall surface 14b of the head cover 14. The first damper 42, for example, is formed with a predetermined thickness from a resilient material such as rubber or the like, and the inner circumferential surface thereof is arranged more radially outward than the first communication hole 28 (see FIGS. 2 and 4A).

Further, in the first damper 42, plural cutaway sections 44 are included, which are recessed with substantially circular shapes in cross section radially inward from the outer circumferential surface of the first damper 42, and the first spigot pins 36 are inserted through the cutaway sections 44. More specifically, the cutaway sections 44 are provided in the same number, at the same pitch, and on the same circumference as the first spigot pins 36. In addition, as shown in FIG. 2, by the first damper 42 being sandwiched between the inner wall surface 14b of the head cover 14 and the flange members 38 of the first spigot pins 36, the first damper 42 is retained in a state of projecting out at a predetermined height with respect to the inner wall surface 14b.

More specifically, at the same time as functioning as positioning means (spigot means) for positioning the one end of the cylinder tube 12 at a predetermined position with respect to the head cover 14, the first spigot pins 36 also function as fixing means for fixing the first damper 42 to the head cover 14.

In addition, when the piston unit 18 is displaced to the side of the head cover 14 (in the direction of the arrow B), by the end thereof coming into abutment against the first damper 42, direct contact between the piston unit 18 and the head cover 14 is avoided, and the occurrence of shocks and impact noises accompanying such contact is suitably prevented.

Further, a first rod hole 46 in which a later-described guide rod 124 is supported is formed in the head cover 14 at a position located further toward the central side with respect to the first communication hole 28. The first rod hole 46 opens toward the side of the inner wall surface 14b of the head cover 14 (in the direction of the arrow A) and does not penetrate through to the outer wall surface 14a.

Figure 3A:
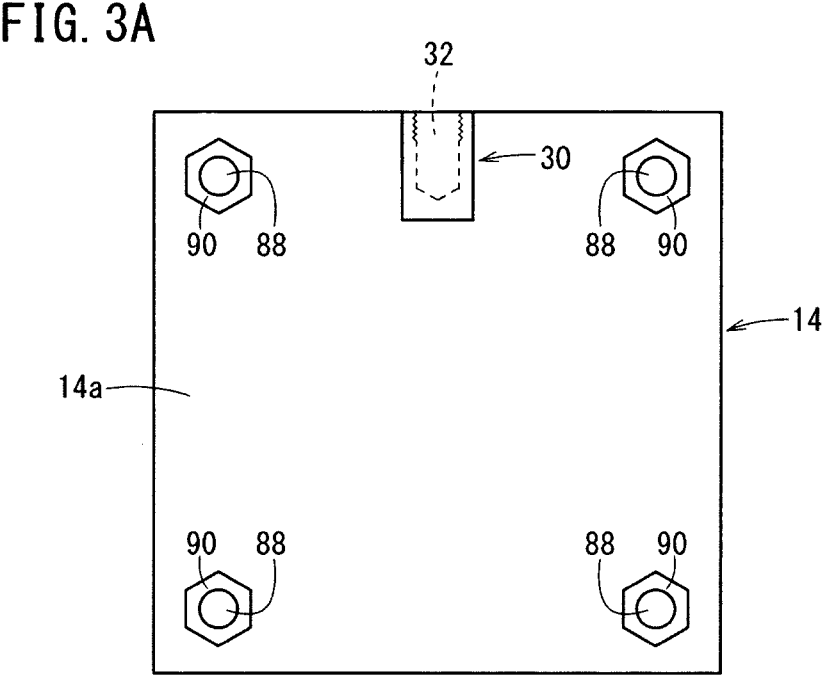
FIG. 3A is a front view as seen from a side of a head cover in the fluid pressure cylinder of FIG. 1.
Figure 3B:
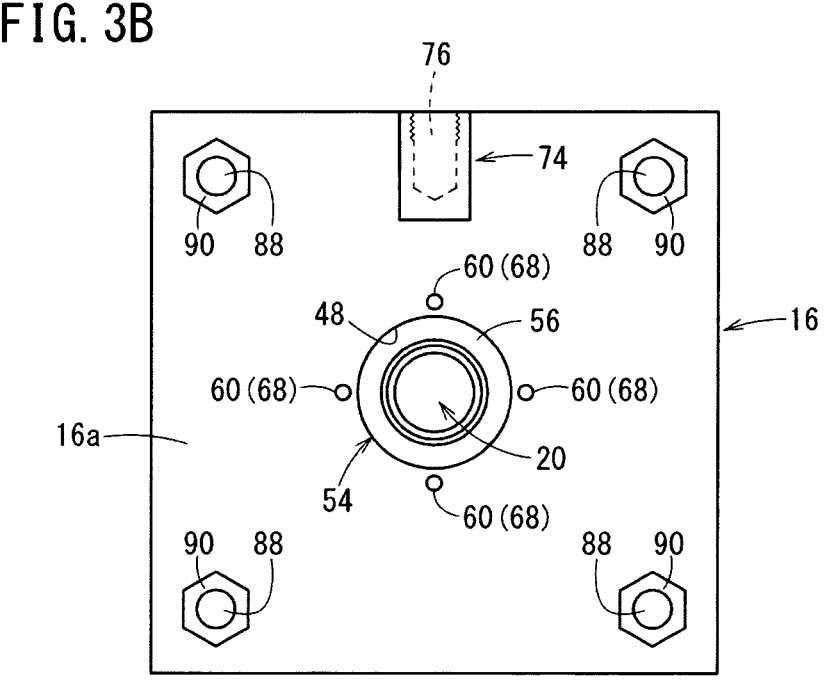
FIG. 3B is a front view as seen from a side of a rod cover in the fluid pressure cylinder of FIG. 1.
Figure 4B:
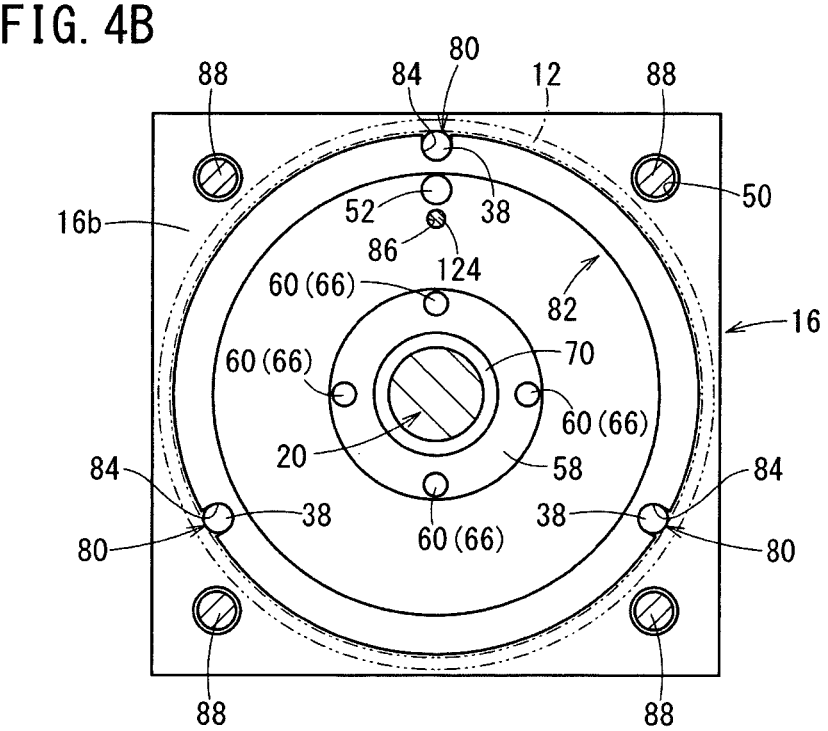
FIG. 4B is a front view shown partially in cross section of the rod cover of FIG. 3B as seen from a side of the cylinder tube.

As shown in FIGS. 1, 3B and 4B, the rod cover 16, in the same manner as the head cover 14, for example, is a plate body that is formed with a substantially rectangular shape in cross section from a metal material, which is provided to cover the other end of the cylinder tube 12. At this time, by the seal member (not shown), which is disposed on the end of the cylinder tube 12, abutting against the rod cover 16, the pressure fluid is prevented from leaking out from the cylinder chamber 22b through a gap between the cylinder tube 12 and the rod cover 16.

A rod hole 48 is formed to penetrate in an axial direction (the directions of arrows A and B) through the center of the rod cover 16, and four second holes 50 through which the later-described connecting rods 88 are inserted are formed in the four corners of the rod cover 16. Further, a second communication hole 52 is formed in the rod cover 16 at a position located on the central side with respect to the second holes 50. The rod hole 48, the second holes 50, and the second communication hole 52 are formed to penetrate respectively in the thickness direction (the directions of arrows A and B) through the rod cover 16.

A holder 54 that displaceably supports the piston rod 20 is provided in the rod hole 48. For example, the holder 54 is formed by a drawing process or the like from a metal material, and includes a cylindrical holder main body 56, and a flange member 58 formed on one end of the holder main body 56 and which is expanded radially outward in diameter. A portion of the holder main body 56 is disposed so as to project outside from the rod cover 16 (see FIG. 1).

In addition, in a state in which the holder main body 56 is inserted through the rod hole 48 of the rod cover 16, and the flange member 58 is arranged on the side of the cylinder tube 12 (in the direction of the arrow B), the flange member 58 abuts against an inner wall surface 16b of the rod cover 16, and a plurality of (for example, four) first rivets 60 are inserted into and made to engage with first rivet holes 64 of the rod cover 16 via first through holes 62 of the flange member 58. As a result, the holder 54 is fixed with respect to the rod hole 48 of the rod cover 16. At this time, the holder 54 is fixed coaxially with the rod hole 48.

The first rivets 60, for example, are self-drilling or self-piercing rivets each having a circular flange member 66 and a shaft-shaped pin member 68, which is reduced in diameter with respect to the flange member 66. In a state with the first rivets 60 being inserted into the first through holes 62 from the side of the flange member 58, and the flange members 66 thereof engaging with the flange member 58, by punching the pin members 68 into the first rivet holes 64 of the rod cover 16, the pin members 68 are engaged with respect to the first through holes 62, and the flange member 58 is fixed with respect to the rod cover 16.

The first rivets 60 are not limited to being self-drilling rivets, and for example, may be general rivets that are fixed by having the pin members 68 thereof crushed and deformed after having been pushed out to the side of an outer wall surface 16a of the rod cover 16.

A bush 70 and a rod packing 72 are disposed alongside one another in the axial direction (the directions of arrows A and B) in the interior of the holder 54, and by the later-described piston rod 20 being inserted through the interior portion thereof, simultaneously with the piston rod 20 being guided along the axial direction by the bush 70, the rod packing 72 slides in contact therewith, whereby leakage of pressure fluid through a gap between the holder 54 and the rod packing 72 is prevented.

As shown in FIGS. 1 and 3B, a second port member 74 from which the pressure fluid is supplied and discharged is provided on the outer wall surface 16a of the rod cover 16, to which a pressure fluid supply source is connected through a non-illustrated pipe. The second port member 74, for example, is constituted from a block body, which is formed from a metal material, and is fixed by welding or the like.

Further, in the interior of the second port member 74, a port passage 76, which is formed with an L-shape in cross-section, is formed, and an opening thereof is fixed with respect to the outer wall surface 16a of the rod cover 16 in a state of being opened in a direction perpendicular to the axial direction of the cylinder tube 12.

In addition, by the port passage 76 of the second port member 74 communicating with the second communication hole 52 of the rod cover 16, the second port member 74 and the interior of the cylinder tube 12 are placed in communication.

Instead of providing the second port member 74, for example, a pipe connection fitting may be connected directly with respect to the second communication hole 52.

On the other hand, on the inner wall surface 16b of the rod cover 16 that is formed on a side of the cylinder tube 12 (in the direction of the arrow B), as shown in FIGS. 1 and 4B, a plurality of (for example, three) second pin holes 78 are formed on a circumferential pitch that is smaller in diameter than the inner circumferential diameter of the cylinder tube 12, and second spigot pins 80 are inserted respectively into the second pin holes 78. More specifically, the second spigot pins 80 are provided in plurality in the same number as the second pin holes 78.

The second pin holes 78 are formed on a circumference having a predetermined diameter with respect to the center of the rod cover 16, and are separated by equal intervals mutually along the circumferential direction. The second spigot pins 80 are formed in the same shape as the first spigot pins 36, and therefore, detailed description thereof is omitted.

In addition, by insertion of the shaft members 40 of the second spigot pins 80 into the second pin holes 78, the second spigot pins 80 are fixed, respectively, to the inner wall surface 16b of the rod cover 16, and the flange members 38 thereof are in a state of projecting out with respect to the inner wall surface 16b of the rod cover 16.

Further, when the cylinder tube 12 is assembled with respect to the rod cover 16, as shown in FIG. 4B, the outer circumferential surfaces of the flange members 38 of the second spigot pins 80 come into internal contact with, i.e., inscribe, respectively, the inner circumferential surface of the cylinder tube 12, whereby the cylinder tube 12 is positioned with respect to the rod cover 16. More specifically, the plural second spigot pins 80 function as positioning means for positioning the other end of the cylinder tube 12 with respect to the rod cover 16.

Stated otherwise, the second spigot pins 80 are arranged on a circumference having a predetermined diameter so that the outer circumferential surfaces thereof internally contact or inscribe the inner circumferential surface of the cylinder tube 12.

A ring shaped second damper 82 is disposed on the inner wall surface 16b of the rod cover 16. The second damper 82, for example, is formed with a predetermined thickness from a resilient material such as rubber or the like, and the inner circumferential surface thereof is arranged more radially outward than the second communication hole 52.

Further, in the second damper 82, plural cutaway sections 84 are included, which are recessed with substantially circular shapes in cross section radially inward from the outer circumferential surface of the second damper 82, and the second spigot pins 80 are inserted through the cutaway sections 84. In addition, by the second damper 82 being sandwiched between the inner wall surface 16b of the rod cover 16 and the flange members 38 of the second spigot pins 80, the second damper 82 is retained in a state of projecting out at a predetermined height with respect to the inner wall surface 16b.

More specifically, the cutaway sections 84 are provided in the same number, at the same pitch, and on the same circumference as the second spigot pins 80.

In this manner, at the same time as functioning as positioning means (spigot means) for positioning the other end of the cylinder tube 12 at a predetermined position with respect to the rod cover 16, the second spigot pins 80 also function as fixing means for fixing the second damper 82 to the rod cover 16.

In addition, when the piston unit 18 is displaced to the side of the rod cover 16 (in the direction of the arrow A), by the end thereof coming into abutment against the second damper 82, direct contact between the piston unit 18 and the rod cover 16 is avoided, and the occurrence of shocks and impact noises accompanying such contact is suitably prevented.

Further, a second rod hole 86 in which the later-described guide rod 124 is supported is formed at a position located further toward the central side of the rod cover 16 with respect to the second communication hole 52. As shown in FIG. 1, the second rod hole 86 opens toward the side of the inner wall surface 16b of the rod cover 16 (in the direction of the arrow B) and does not penetrate through to the outer wall surface 16a.

In addition, in a state in which the one end of the cylinder tube 12 is placed in abutment against the inner wall surface 14b of the head cover 14, the other end thereof is placed in abutment against the inner wall surface 16b of the rod cover 16, and the connecting rods 88 are inserted respectively through the four first and second holes 26, 50, fastening nuts 90 (see FIGS. 1, 3A and 3B) are screw-engaged on both ends thereof, and by tightening the fastening nuts 90 until they come into abutment against the outer wall surfaces 14a, 16a of the head cover 14 and the rod cover 16, the cylinder tube 12 is fixed in a condition of being sandwiched and gripped between the head cover 14 and the rod cover 16.

Figure 5:
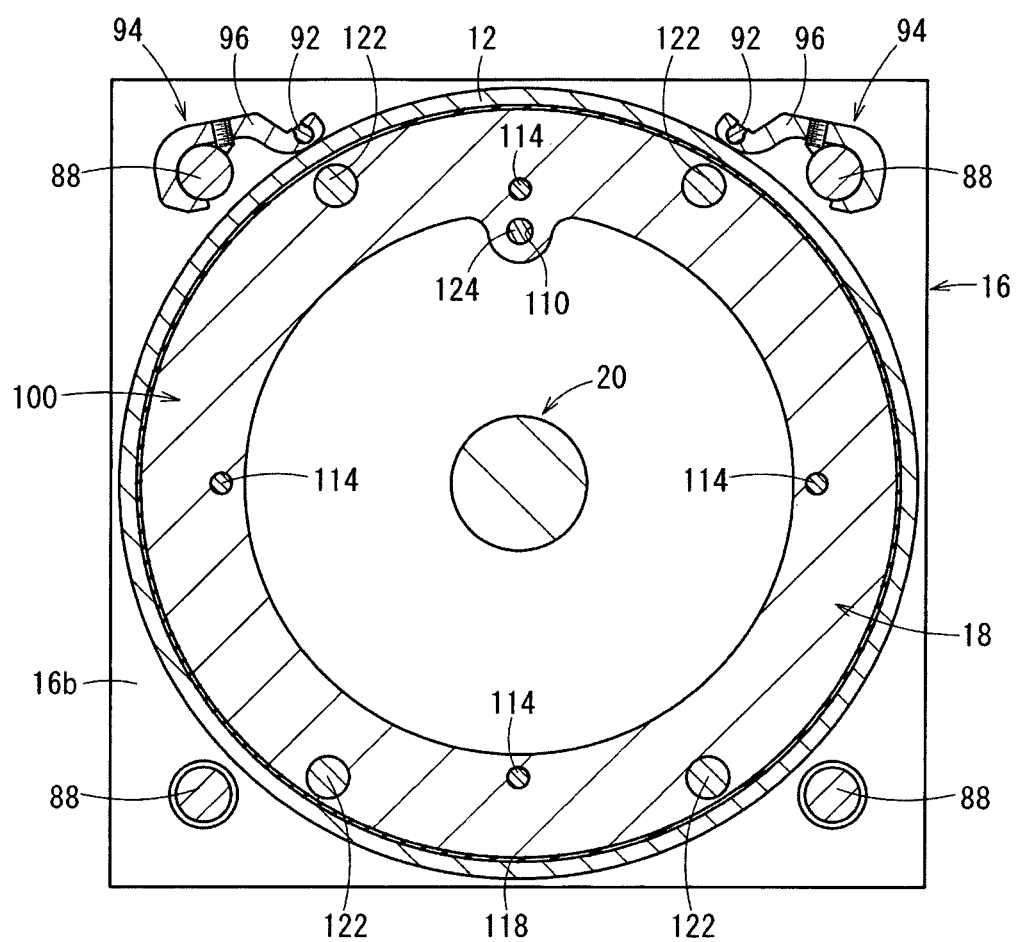
FIG. 5 is a cross-sectional view taken along line V-V of FIG. 1.
Figure 6:
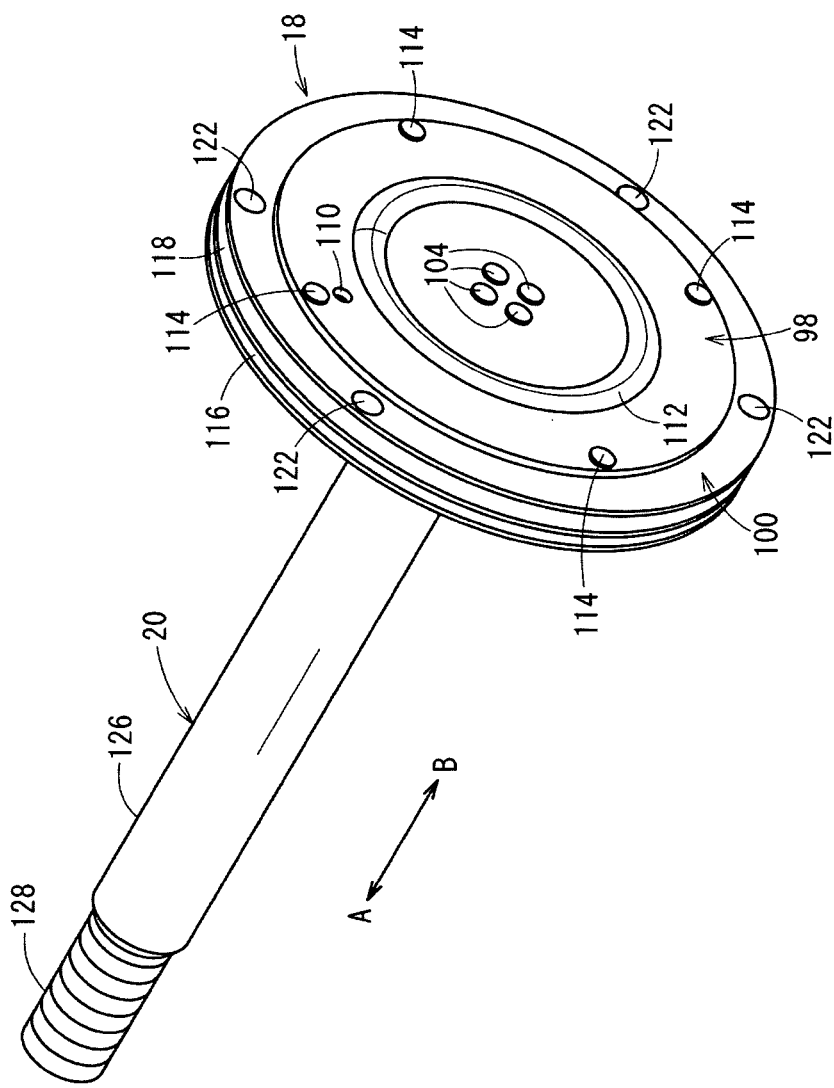
FIG. 6 is an exterior perspective view of the piston unit and the piston rod in the fluid pressure cylinder of FIG. 1.
Figure 7:
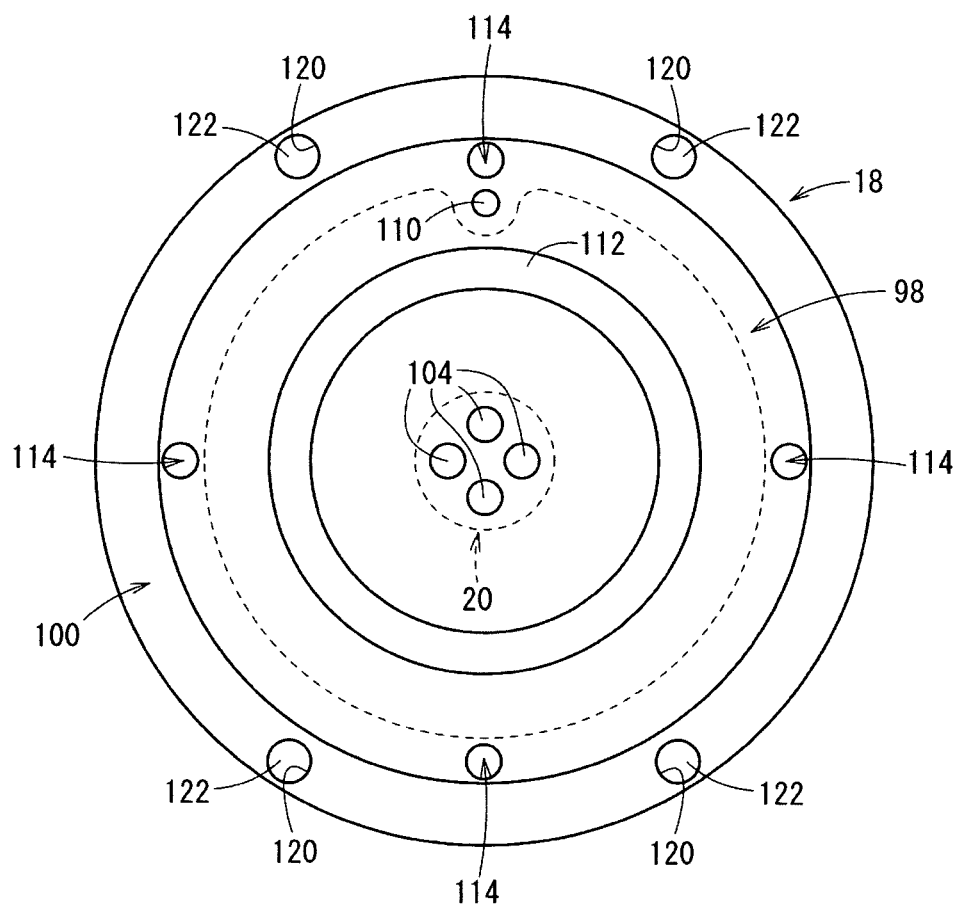
FIG. 7 is a front view of the piston unit shown in FIG. 6.

Further, as shown in FIG. 5, sensor retaining bodies 94 that hold detecting sensors 92 for detecting the position of the piston unit 18 are disposed on the connecting rods 88. The sensor retaining bodies 94 are disposed substantially perpendicular with respect to the direction of extension of the connecting rods 88, and are disposed so as to be capable of moving along the connecting rods 88, together with including mounting sections 96 that extend from the locations retained on the connecting rods 88 and in which the detecting sensors 92 are mounted. In the mounting sections 96, grooves, which are circular in cross section, for example, are formed substantially in parallel with the connecting rods 88, with the detecting sensors 92 being housed and retained in the grooves.

The detecting sensors 92 are magnetic sensors that are capable of detecting magnetism possessed by magnets 122 of a later-described ring body (piston main body) 100. The sensor retaining bodies 94 including the detecting sensors 92 are appropriately provided at a quantity as needed.

As shown in FIGS. 1, 2, 6 through 8, the piston unit 18 includes a disk shaped plate body 98, which is connected to one end of the piston rod 20, and the ring body 100 connected to an outer edge portion of the plate body 98.

The plate body 98, for example, is formed with a substantially constant thickness from a metal plate member having elasticity, and a plurality of (for example, four) second through holes 102 that penetrate therethrough in the thickness direction are disposed in a central portion of the plate body 98. In addition, second rivets 104 are inserted into the second through holes 102, and by distal ends thereof being inserted into and engaged with second rivet holes 106 that are formed in the one end of the piston rod 20, the plate body 98 is connected substantially perpendicular to the one end of the piston rod 20.

The second rivets 104, for example, similar to the first rivets 60, are self-drilling rivets. After the second rivets 104 are inserted such that the flange members 66 thereof are placed on the side of the head cover 14 (in the direction of the arrow B) of the plate body 98, by punching the pin members 68 into the interior of the piston rod 20, the pin members 68 are engaged with respect to the second rivet holes 106, and the plate body 98 is fixed in engagement with respect to the piston rod 20.

Further, on an outer edge portion of the plate body 98, a plurality of (for example, four) third through holes 108 are provided that penetrate in the thickness direction. The third through holes 108 are formed at equal intervals mutually along the circumferential direction of the plate body 98, together with being formed on the same diameter with respect to the center of the plate body 98.

Furthermore, on the plate body 98, at a position more on an inner circumferential side than the third through holes 108, a rod insertion hole 110 is formed that penetrates in the thickness direction, and through which the later-described guide rod 124 is inserted.

Further still, on the plate body 98, at a position between the outer edge portion and the center portion that is fixed to the piston rod 20, for example, a rib 112 is included which has a curved shape in cross section. The rib 112 is formed in an annular shape along the circumferential direction, and is formed so as to project out toward an opposite side (in the direction of the arrow B) from the side of the piston rod 20. Further, the rib 112 may be formed to project out toward the side of the piston rod 20 (in the direction of the arrow A). Moreover, the rib 112 is formed at a position more on the inner circumferential side than the rod insertion hole 110.

By providing the rib 112, the degree of deflection of the elastic plate body 98 is set to a predetermined amount. Stated otherwise, by appropriately modifying the shape and position of the rib 112, the amount of deflection of the plate body 98 can be freely adjusted. Further, the aforementioned rib 112 need not necessarily be provided.

The plate body 98 is not limited to the case of being connected to the end of the piston rod 20 by the second rivets 104, and for example, the plate body 98 may be connected to the end of the piston rod 20 by caulking or welding, may be connected thereto by press-contact and adhesion, or may be connected by screw-insertion. Furthermore, the plate body 98 may be connected by press-fitting of a pin into the end of the piston rod 20 and plastic deformation of the end of the pin.

The ring body 100, for example, is formed with a circular shape in cross section from a metal material, and the outer edge portion of the plate body 98 is placed in abutment against an edge portion thereof on the side of the head cover 14 (in the direction of the arrow B), and is fixed thereto by a plurality of third rivets 114. The third rivets 114, for example, similar to the first and second rivets 60, 104, are self-drilling rivets. After the third rivets 114 are inserted such that the flange members 66 thereof are placed on the side of the head cover 14 (in the direction of the arrow B) of the plate body 98, by punching the pin members 68 into third rivet holes 115 of the ring body 100, the pin members 68 are engaged and latched in the interior thereof.

Further, as shown in FIG. 2, a piston packing 116 and a wear ring 118 are disposed on the ring body 100 through annular grooves that are formed on the outer circumferential surface thereof. In addition, by the piston packing 116 sliding in contact with the inner circumferential surface of the cylinder tube 12, leakage of pressure fluid through a gap between the ring body 100 and the cylinder tube 12 is prevented. Further, by the wear ring 118 sliding in contact with the inner circumferential surface of the cylinder tube 12, the ring body 100 is guided in the axial direction (the directions of arrows A and B) along the cylinder tube 12.

Furthermore, as shown in FIGS. 1, 2, and 5 through 7, on a side surface of the ring body 100 facing toward the head cover 14, a plurality of (for example, four) holes 120, which are opened in the axial direction, are formed, and the cylindrical magnets 122 are press-fitted, respectively, into the interiors of the holes 120. The arrangement of the magnets 122 is such that, when the piston unit 18 is disposed in the interior of the cylinder tube 12, as shown in FIG. 5, the magnets 122 are disposed at positions facing toward the four connecting rods 88, and the magnetism of the magnets 122 is detected by the detecting sensors 92 of the sensor retaining bodies 94 that are provided on the connecting rods 88.

As shown in FIGS. 1, 2, and 4A through 5, the guide rod 124 is formed as a shaft with a circular shape in cross section, with one end thereof being inserted into the first rod hole 46 of the head cover 14, and the other end thereof being inserted into the second rod hole 86 of the rod cover 16, together with being inserted through the rod insertion hole 110 of the plate body 98. Owing thereto, in the interior of the cylinder tube 12, the guide rod 124 is fixed to the head cover 14 and the rod cover 16 and is disposed in parallel with the axial direction (displacement direction) of the piston unit 18, together with the piston unit 18 being prevented from undergoing rotation when the piston unit 18 is displaced in the axial direction. Stated otherwise, the guide rod 124 functions as a rotation stop for the piston unit 18.

Further, an O-ring is disposed in the rod insertion hole 110, whereby leakage of pressure fluid through a gap between the guide rod 124 and the rod insertion hole 110 is prevented.

As shown in FIG. 1, the piston rod 20 is made up from a shaft having a predetermined length along the axial direction (the directions of arrows A and B), and includes a main body portion 126 formed with a substantially constant diameter, and a small diameter distal end portion 128 formed on the other end of the main body portion 126. The distal end portion 128 is disposed so as to be exposed to the outside of the cylinder tube 12 through the holder 54. The one end of the main body portion 126 is formed in a substantially planar surface shape perpendicular to the axial direction of the piston rod 20, and is connected to the plate body 98.

The fluid pressure cylinder 10 according to the embodiment of the present invention is constructed basically as described above. Next, operations and advantageous effects of the fluid pressure cylinder 10 will be described.

At first, a pressure fluid is supplied to the first port member 30 from a non-illustrated pressure fluid supply source. In this case, the second port member 74 is placed in a state of being open to atmosphere under a switching operation of a non-illustrated switching valve. Consequently, the pressure fluid is supplied from the first port member 30 to the port passage 32 and the first communication hole 28, and by the pressure fluid that is supplied into the cylinder chamber 22a from the first communication hole 28, the piston unit 18 is pressed toward the side of the rod cover 16 (in the direction of the arrow A).

In addition, the piston rod 20 is displaced together with the piston unit 18, and by the end surface of the ring body 100 coming into abutment against the second damper 82, a displacement terminal end position is reached. At this time, the application of shocks to the piston unit 18 from the rod cover 16 is mitigated by the second damper 82.

Further, when the ring body 100 of the piston unit 18 comes into abutment against the second damper 82, at the same time that imparting of shocks to the piston unit 18 is buffered by the second damper 82, due to the plate body 98 undergoing flexure at a location between the ring body 100 disposed on the outer edge portion and the central portion that is connected to the piston rod 20, shocks that are imparted to the ring body 100 are suitably absorbed, and transmission of such shocks to the side of the piston rod 20 is suppressed.

On the other hand, in the case that the piston unit 18 is to be displaced in the opposite direction (in the direction of the arrow B), together with the pressure fluid being supplied to the second port member 74, the first port member 30 is placed in a state of being open to atmosphere under a switching operation of the switching valve (not shown). In addition, the pressure fluid is supplied from the second port member 74 to the cylinder chamber 22b through the port passage 76 and the second communication hole 52, and by the pressure fluid that is supplied into the cylinder chamber 22b, the piston unit 18 is pressed toward the side of the head cover 14 (in the direction of the arrow B).

In addition, as shown in FIG. 8, the piston rod 20 is displaced under a displacement action of the piston unit 18, and the initial position is restored by the ring body 100 of the piston unit 18 coming into abutment against the first damper 42 of the head cover 14.

Similarly, at this time, when the ring body 100 of the piston unit 18 comes into abutment against the first damper 42, at the same time that imparting of shocks to the piston unit 18 is buffered by the first damper 42, as shown in FIG. 8, due to the plate body 98 undergoing flexure at a location between the ring body 100 disposed on the outer edge portion and the central portion that is connected to the piston rod 20, shocks that are imparted to the ring body 100 are further suitably absorbed, and transmission of such shocks to the side of the piston rod 20 is suppressed.

In the foregoing manner, according to the present embodiment, in the fluid pressure cylinder 10, the piston unit 18 is constituted from the plate body 98, the central portion of which is connected to one end of the piston rod 20, and the ring body 100 that is disposed on the outer edge portion of the plate body 98. In addition, by the plate body 98 being formed from an elastically deformable metal material, the piston unit 18 is displaced along the axial direction (in the directions of arrows A and B), and at displacement terminal end positions where the ring body 100 abuts against the head cover 14 or the rod cover 16, shocks imparted to the ring body 100 at the time of abutment can be absorbed by the plate body 98 undergoing elastic deformation.

As a result, with a simple configuration in which the plate body 98 of the piston unit 18 is formed from an elastically deformable plate member having a predetermined thickness, transmission of shocks to the side of the piston unit 18 when the piston unit 18 abuts against the head cover 14 and the rod cover 16 is suppressed, and for example, in the case of transporting a workpiece or the like at the other end of the piston rod 20, transmission of shocks to the workpiece can be prevented.

Further, by appropriately changing the material and plate thickness, the presence or absence of the rib 112, or the shape and positioning, etc., of the plate body 98, since the capability to absorb shocks can freely be changed, for example, by changing the material thereof responsive to conditions such as the displacement speed of the piston unit 18, and the weight of the piston unit 18 including the ring body 100, such shocks can be absorbed reliably.

Further, the aforementioned piston unit 18 including the plate body 98 is not limited to the configuration described above, and for example, as in a piston unit 150 according to a first modification shown in FIG. 9A, a plate body 158 may be constructed from a plurality of stacked first through third plates 152, 154, 156.

The plate body 158 is made up from the first plate 152, a central portion of which is connected by second rivets 104 to one end of the piston rod 20, the second plate 154 stacked thereon which is smaller in diameter than the first plate 152, and the third plate 156 stacked thereon which is smaller in diameter than the second plate 154. A main body portion 126 of the piston rod 20 is inserted through central portions of the second and third plates 154, 156, respectively. The first through third plates 152, 154, 156, for example, are fixed together in an integral manner by welding, deposition, or the like.

The first through third plates 152, 154, 156 are formed with different coefficients of elasticity, respectively, and are disposed coaxially with respect to the piston rod 20. More specifically, the shapes and materials, etc., of the first through third plates 152, 154, 156 are formed to differ from one another, respectively.

According to this type of structure, the plate body 158 is constituted by stacking the plural first through third plates 152, 154, 156, which have different coefficients of elasticity. Thus, in comparison with the plate body 98 being constructed from a single plate, the degree to which shocks are absorbed at the displacement terminal end positions can be increased. Therefore, by using this type of plate body 158, for example, in the case that application of shocks to the piston unit 150 is great, it is possible for such shocks to be buffered appropriately. Together therewith, by selectively combining the number, materials, and shapes of the plates, it is possible to freely adjust the shock absorbing capability responsive to the size of the shocks that are imparted to the piston unit 150.

Further, as in a piston unit 160 according to a second modification shown in FIG. 9B, a configuration may be provided in which an outer ring body 162 is of a two piece structure, in which the outer edge portion of the plate body 98 is sandwiched between the two pieces. The ring body 162 is made up from a first ring 164 disposed on the side of the head cover 14 (in the direction of the arrow B), and a second ring 166 disposed on the side of the rod cover 16 (in the direction of the arrow A). In a state in which the first ring 164 and the second ring 166 are arranged so as to sandwich the outer edge of the plate body 98 therebetween, the ring body 162 is connected together integrally, for example, by welding or the like. Further, although the central portion of the plate body 98 is connected to the one end of the piston rod 20 by the second rivets 104, the plate body 98 may be connected to the end of the piston rod 20 using welding and caulking or the like, may be connected thereto by press-contact and adhesion, or may be connected by screw-insertion. Furthermore, the plate body 98 may be connected by press-fitting of a pin into the end of the piston rod 20 and plastic deformation of the end of the pin.

In addition, in the ring body 162, for example, on the first ring 164, magnets 122 are accommodated in the interior thereof, and a wear ring 118 is provided on the outer circumferential surface, whereas a piston packing 116 is disposed on the outer circumferential surface of the second ring 166.

In accordance with this type of configuration, by disposing the plate body 98 in the widthwise center of the ring body 162, since spaces can be provided on the inner circumferential sides of the ring body 162, by utilizing such spaces effectively, the dimension of the fluid pressure cylinder 10 in the axial direction can be made smaller in size, along with enabling shocks to be suitably mitigated at the displacement terminal end positions by deformation of the plate body 98.

For example, as a method for using the aforementioned spaces, a spring may be disposed between the piston unit 160 and the head cover 14 or the rod cover 16, so that in a single-acting type of fluid pressure cylinder in which displacement only in one direction is carried out under the supply of a pressure fluid, whereas displacement in the other direction is carried out by the elastic force of the spring, the spaces can be utilized effectively as a space for accommodating a portion of the spring therein.

Furthermore, as in a piston unit 170 according to a third modification shown in FIG. 9C, a configuration may be provided in which the ring body 100 is disposed on the side of the head cover 14 (in the direction of the arrow B) on the outer edge portion of the plate body 98. Further, although the central portion of the plate body 98 is connected to the one end of the piston rod 20 by the second rivets 104, the plate body 98 may be connected to the end of the piston rod 20 using welding and caulking or the like, may be connected thereto by press-contact and adhesion, or may be connected by screw-insertion. Furthermore, the plate body 98 may be connected by press-fitting of a pin into the end of the piston rod 20 and plastic deformation of the end of the pin.

In accordance with this type of configuration, in the cylinder chamber 22a of the fluid pressure cylinder 10, since it is possible to provide a space on the inner circumferential side of the piston unit 170 on the side of the head cover 14, by utilizing the space effectively, the dimension of the fluid pressure cylinder 10 in the axial direction can be made smaller in size, along with enabling shocks to be suitably mitigated at the displacement terminal end positions by deformation of the plate body 98.

More specifically, in the interior of the cylinder chamber 22a, the position of the ring body 100 with respect to the plate body 98 may be set corresponding to the position of the space that is desired to be effectively utilized.

The fluid pressure cylinder according to the present invention is not limited to the above embodiment. Various changes and modifications may be made to the embodiment without departing from the scope of the invention as set forth in the appended claims.

The invention claimed is:

1. A fluid pressure cylinder comprising:
a cylinder tube including cylinder chambers defined in interior thereof;
cover members attached to ends of the cylinder tube;
a piston disposed displaceably along the cylinder chambers;
a piston rod that is connected to the piston;
the piston comprising a piston main body configured to slide in contact with an inner circumferential surface of the cylinder tube; and
an elastically deformable plate body configured to connect an end of the piston rod and the piston main body;
wherein the plate body is configured to undergo elastic deformation when the piston abuts against the cover members, and
wherein the plate body comprises a plurality of stacked plate members with different coefficients of elasticity.

2. The fluid pressure cylinder according to claim 1, wherein an annular rib that projects in a thickness direction is disposed on the plate body.

* * * * *